United States Patent [19]

Hostetler et al.

[11] Patent Number: 5,184,571
[45] Date of Patent: Feb. 9, 1993

[54] AUTOMATICALLY SELF-CLEANING WATERING SYSTEM

[75] Inventors: Robert D. Hostetler, Elkhart, Ind.; Philippe Plouzen, Sibiril, France

[73] Assignee: Avtron, Inc., Elkhart, Ind.

[21] Appl. No.: 781,802

[22] Filed: Oct. 22, 1991

[51] Int. Cl.$^5$ .................. A01K 7/06; A01K 39/02
[52] U.S. Cl. ........................... 119/72; 119/72.5; 119/73; 137/240
[58] Field of Search .............. 119/51.5, 72, 72.5, 119/73, 18; 137/240, 241, 238

[56] References Cited

U.S. PATENT DOCUMENTS

| | | | |
|---|---|---|---|
| 2,865,328 | 12/1958 | Hostetler | 119/72 |
| 3,110,287 | 11/1963 | Godshalk | 119/72 |
| 4,055,147 | 10/1977 | Fletcher et al. | 119/72.5 |
| 4,344,456 | 8/1982 | Hostetler | 137/403 |
| 4,757,784 | 7/1988 | Hammer | 119/72 |
| 4,991,621 | 2/1991 | Steudler, Jr. | 137/505 |
| 5,025,754 | 6/1991 | Plyler | 119/73 |

FOREIGN PATENT DOCUMENTS

| | | | |
|---|---|---|---|
| 596195 | 3/1978 | U.S.S.R. | 119/72 |
| 1351548 | 11/1987 | U.S.S.R. | 119/72 |

Primary Examiner—John G. Weiss
Attorney, Agent, or Firm—Baker & Daniels

[57] ABSTRACT

The present invention is a watering system for small animals and fowl which provides for automatic cleaning of the internal surfaces of the conduits of the system. In such a watering system, residue from the water supply or nutrients in the form of vitamins, medicines, or other water additives may accumulate on the inner surfaces of the watering system conduits. This accumulation of sediment and nitrients provides a suitable environment for the growth of bacteria and other biological contaminants which may infect livestock. The invention involves connecting the conduits of a poultry house in an arrangement so that upon activation of a high pressure water supply, a high pressure fluid circuit is formed within the conduits to flush the inner surfaces of the conduits. The system may be operated automatically because mechanical switching of valves on the conduits is not required to provide the high pressure fluid flow which scrapes away the biofilm on the inner surfaces of the conduit. Also, by operation of a vacuum effect in the drinker valve bodies, pulsation of the high pressure fluid flow draws out suspended dirt and other particles from the valve body, thus cleaning a part of the watering system which is otherwise difficult to reach.

46 Claims, 4 Drawing Sheets

AUTOMATICALLY SELF-CLEANING WATERING SYSTEM

BACKGROUND OF THE INVENTION

1. Field of the Invention

The present invention relates to watering systems for chickens or small animals. More specifically, the field of the invention is that of such watering systems which provide for cleaning the internal surfaces of the water conduits.

2. Prior Art

The proper provision of water is essential for safe and efficient nurturing of fowl and small animals, for example in raising chickens. The proper amount of water is critical to develop the chickens quickly for consumption, and is at least as important as food. Water is important in terms of cost because chickens receiving more water consume less food. In addition to the chickens needing water to grow, water can provide other benefits, for example, medicine and vitamins can be added to provide the chickens beneficial nutrients. However, problems with the water supply can adversely affect the chickens. Leakage in the water supply system can foster bacteria growth and infection, and left unchecked can flood the hen house and drown the chickens. Therefore, a desirable feature of a watering system is the prevention of water accumulating on the floors of the poultry house.

To accommodate the desire for better water supply, water supply systems exist which include a horizontal water supply conduit with water dispensers located along the conduit. These prior art systems utilize dispenser valves having plastic bodies and metal parts commonly formed by machining. The machined parts of the valve can wear and an effect of that wear is that the rate of liquid flow through the valve increases, to the point the flow is in excess of what the chicken can ingest. If too much water is dispensed each valve opening, then the excess water can wet the chicken and wet the litter which fosters bacteria and mold and thereby endangers their lives. The aforementioned wear necessitates replacement or removal of the valves of water supply systems.

A watering system described in U.S. Pat. Nos. 4,284,036, 4,491,088, 4,589,373, and 4,637,345 solves many of the aforementioned problems, and each of these patents is expressly incorporated by reference herein. These patents disclose a watering system having a drinker valve which is used to supply water and nutrients to chickens or other small animals. Conventionally, a plurality of drinker valves are disposed on a water supply conduit, and the water supply conduit is attached to a ballast pipe which is suspended at a height convenient for the chickens or small animals to reach the drinker valves. A pressure regulator is provided at one end of the conduit to provide a supply of low pressure water to the drinker valves. Each poultry house may include several rows of the conduits, with each row including its own ballast pipe, regulator, and suspension system.

A problem in raising poultry involves the infection of the poultry by bacteria, micro-organisms, and other biological contaminants. In the water conduits of the poultry houses, medication, vitamins, and other additional nutrients may be added to the water. Further, sediment, sludge, or other residue may be originally present in water from the water source. These contaminants may be deposited on the internal surfaces and build up a layer of biofilm. The biofilm provides an environment which is suitable for the growth of bacteria, and the biofilm may become infected with bacteria which can then disseminate throughout the conduit and out the drinker valves. Once the chicken or small animal ingests the bacteria, it may significantly contaminate the meat of the chicken. Similar to contamination of chicken meat by salmonella, chicken meat having other bacterial contamination may cause food poisoning in humans. Therefore, it is desirable to clean off the sediment, residue, and biofilm from the internal surfaces of the water conduits in order to minimize the presence of foreign particles and biological contamination in the drinking water.

Figure 1:
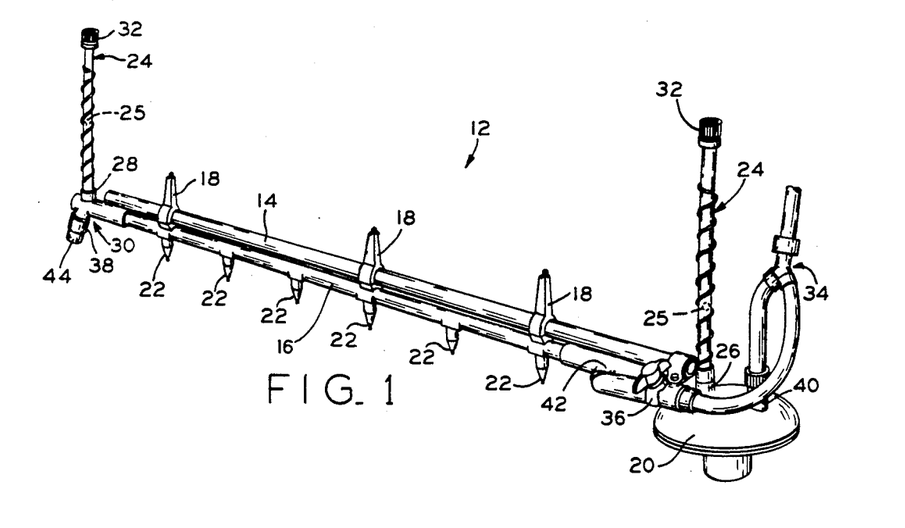
FIG. 1 is a perspective view of a prior art watering system.

One prior art system for cleaning the internal surfaces of water conduits is shown in FIG. 1. Watering system 12 includes ballast pipe 14, water conduit 16, connectors 18, and regulator 20. Connectors 18 secure together pipe 14 and conduit 16 so that the conduit is adequately supported when filled with water and suspended above the ground. Regulator 20 is secured to pipe 14 and fluidly coupled to conduit 16 to provide low pressure water to drinker valves 22 from the relatively high pressure water supplied by the water main (not shown in FIG. 1). Watering system 12 includes two riser tubes 24, one of which is connected to riser port 26 of regulator 20 and the other is connected to riser port 28 of conduit terminator 30. Balls 25 are located in riser tubes 24, and their height in tube 24 is indicative of the fluid pressure in the inlet side of regulator 20. Each riser tube 24 includes self-sealing riser cap 32 which seals off riser tube 24 during high pressure flushing of watering system 12.

The components of watering system 12 which provide the flushing feature includes Y-hose 34, flush ball valve 36, and check valve 38. Y-hose 34 provides a fluid coupling from the water main to input port 40 of regulator 20 and to flush ball valve 36. Flush ball valve 36 is connected to conduit 16 at flush valve port 42 which is positioned downstream from regulator 20. Check valve 38 is connected to conduit terminator 30, and during the high pressure flushing, check valve 38 opens and allows the high pressure water to exit conduit 16 through an attached hose 44.

To flush watering system 12, flush ball valve 36 must be manually switched to the operative position. When so switched, the relatively high pressure water from the water main causes check valve 38 to open so that instead of low pressure water being supplied within conduit 16 by regulator 20, the high pressure water from the water main flows through conduit 16 from port 42 to check valve 38. Although riser tubes 24 are initially filled with water, riser caps 32 in cooperation with balls 25 close off the ends of riser tubes 24 so that the only passageway for exiting water is through check valve 38. The flow of high pressure water tends to scrape the conduit interior surfaces and remove residue creating the biofilm from the interior of the conduit. Another benefit of the system is that during hot weather, flushing the conduit with colder water tends to provide cooler water to the drinkers.

In poultry houses which include several rows of watering system 12 as depicted in FIG. 1, each row requires all the components of the flushing system: a Y-hose, a flush valve, a flush valve port, a conduit terminator, and a check valve. A disadvantage of this system involves the expense of providing and installing all the flushing components on every row of watering conduits. Further, to flush all the conduits in a poultry house with multiple rows, the operator must manually turn on the flush valve of each row, and subsequently manually turn off each flush valve.

Another disadvantage of the prior art system depicted in FIG. 1 relates to the location of the flush valve port at a position on the conduit between the regulator and the terminator. With the flush valve port at this intermediate position on the conduit, only the portion of the conduit which is downstream from the flush valve port is flushed and scraped by the flow of water main pressure water. However, water does not flush through the upstream portion because no exit exists on that side of the flush valve port. Without the higher pressure water flow, the bio-film in the upstream portion of the conduit may not be removed. Therefore, it is undesirable to omit any portion of the conduit from the flushing path.

A further potential problem relates to the disposal of the waste water which is produced by flushing the conduit interior. A poultry house operator may wish to view or otherwise sample the waste water. Also, environmental regulations may require special procedures for disposing waste water, or a poultry house operator may find dumping the waste water at or near the site of the poultry house to be undesirable. Therefore, one desired feature of a watering system involves providing for the disposal of the waste water resulting from flushing.

What is needed is an improved cleaning system for small animal and poultry watering systems.

Also needed is such a system with a fewer number and a more convenient arrangement of components.

A further need is for such a system which flushes all the internal surfaces of the water conduit.

Additionally, such a cleaning system which is more conveniently installed and operated is needed.

Yet another need is for such a system which makes some provision for the disposal of the waste water.

SUMMARY OF THE INVENTION

The present invention is an automatically self-cleaning watering system for chickens and small animals. The system automatically creates a high pressure fluid circuit so that a high pressure fluid may be flushed through all the water conduits of the poultry house. The system may be activated without any physical manipulation of valves attached to the conduits, thus allowing for automatic control.

The cleaning system utilizes the riser ports of the regulators to define a high pressure circuit that overrides the supply of low pressure water by the regulators. Under conventional operation, water is supplied at standard water main pressure to the regulator water inlet wherein the regulator provides a low pressure supply at the outlet or low pressure side of the regulator. By starting the cleaning system pump, the high pressure water interrupts and closes off the inlet side of the regulators. The pump may be a pressure or a suction pump and may flush another fluid, e.g., a cleaning fluid or a different temperature water, through the conduit interior.

The cleaning system may include several rows of conduits by utilizing the riser ports of the regulators and the terminal ends of the conduit to connect the rows so that when a high pressure fluid is supplied to the conduits, the high pressure circuit is automatically created. This allows for a single activation of the cleaning system which flushes all the conduits in the poultry house. Further, a pump may be automatically activated to provide a high pressure fluid source which automatically activates a high pressure fluid circuit. Such automatic activation may be based on a timer which periodically flushes the conduit, or based on a thermostat which flushes the conduit when the water temperature falls outside a predetermined range.

The high pressure circuit includes a fluid passage from the high pressure side of the regulator, through the entire length of the conduit, to the end of the conduit. Also, the fluid passage by-passes the inlet side of the regulator. In a multiple row watering system, the high pressure source is connected to the regulator riser port of the first row. Each row may be connected in series to a conduit of another row by a coupling to the other conduit end or the other regulator. The high pressure circuit is simply installed by connecting the conduit ends together and the regulator riser ports together with hoses or other fluid conduits. The balls in the riser tubes are prevented from blocking the high pressure flow by inserts which allow for fluid flow around the balls and through the insert. Thus, the riser tubes function as a pressure gauge as well as a fluid coupling.

The final row may be connected to a disposal tank and thereby collect the waste water. The water or other high pressure fluid flowing through the conduit thus scrapes the interior walls of the entire conduit when the high pressure circuit is activated, and the waste water is captured in the disposal tank after traversing through the high pressure circuit. The disposal tank may be the supply tank, or alternatively the disposal tank may be separate from the supply tank thus allowing for visual inspection of the waste water before actual disposal.

The cleaning system uses a pressure pump, or alternatively a suction pump, to provide the high pressure fluid. The resulting high pressure fluid exceeds the threshold pressure of the regulators, thereby closing off the inlet side of the regulator and preventing any fluid communication with the drinking water supply. An advantage of such high pressure is that dirt and other sediment within the drinker valves is sucked out of the valve body and out of the conduit by a vacuum effect when the pump is shut off and the flushing water leaves the conduit. Pulsation of the high pressure fluid flow further helps in drawing out suspended dirt and other particles from the valve body, thus cleaning a part of the watering system which is otherwise difficult to reach. This effect is achieved by the high pressure differential created by the pump which results in the vacuum effect in the drinker valve bodies. In order to achieve this effect with drinker valve assemblies which include a metering pin, nubs are formed on the metering pin so that the pin's top surface does not completely block the flow of fluid during the vacuum action in the valve body.

The dispenser sections of the conduit are formed to minimize the amount of material which protrudes into the cylindrical passageway formed by the inner surface of the conduit and interferes with fluid flow in the conduit. By minimizing the amount of protruding material, the maximum effect of the high pressure flushing is achieved. Also, a mouse may be sent through the conduit more easily and biofilm directly taken off the inner conduit surfaces.

The present invention, in one form, is a watering system for fowl and small animals. The watering system is adapted to be connected to a first fluid supply and a second fluid supply, and comprises a conduit, a first and second fluid supplying devices, and a control. The conduit provides fluid transmission, and includes an inlet, an outlet, and a plurality of drinker valves. The first fluid supplying device provides the first fluid to the conduit, and the second fluid supplying device provides the second fluid to the conduit. The control fluidly couples the conduit inlet alternatively to the first fluid supplying device and to the second fluid supplying device. The control includes a regulator for providing fluid from the first fluid supplying device to the conduit at a predetermined, relatively low pressure. The control also includes an activator for automatically activating the second fluid supplying device whereby when the second fluid supplying device is not activated the regulator provides the first fluid to the conduit at low pressure, and upon activation of the second supplying device by the activator, the second fluid supplying device provides the second fluid to the conduit at high pressure for flushing the conduit.

One object of the present invention is to provide an improved cleaning system for small animal and poultry watering systems.

Also an object is to provide such a system with a fewer number and a less complex interrelation of components.

A further object is to provide such a system which cleans all portions of the water conduit.

An additional object is to provide such a cleaning system which is more conveniently installed and operated.

Yet another object is to provide such a system which makes some provision for the disposal of the waste water.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplifications are not to be construed as limiting the scope of the invention in any manner.

DESCRIPTION OF THE PREFERRED EMBODIMENT

Figure 2:
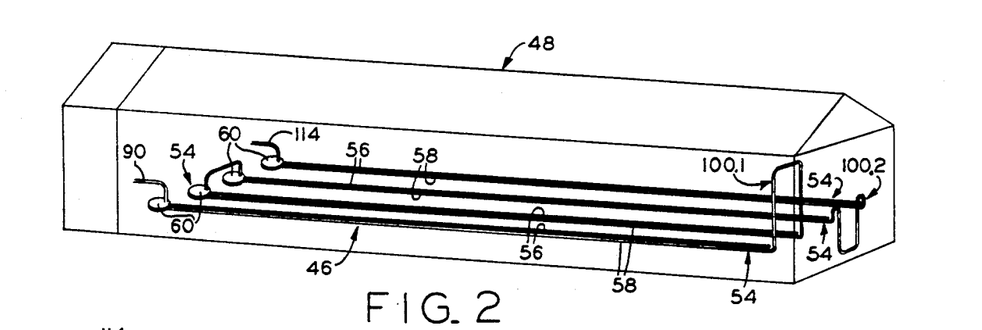
FIG. 2 is a perspective view of the automatically cleaning watering system of the present invention.

The present invention relates to watering systems for fowl and small animals such as chicken watering system 46 disposed in poultry house 48 as shown in FIG. 2. Chicken watering system 46 is fluidly coupled to high pressure fluid supply arrangement 50 shown in FIG. 8, or alternatively to high pressure fluid supply arrangement 52 shown in FIG. 9, both of which are described in greater detail below. Each row 54 of watering system 46 includes ballast pipe 56, conduit 58, and regulator 60. Each conduit 58 includes a plurality of drinker valves, for example the drinker valves cited in the aforementioned U.S. Pat. Nos. 4,284,036, 4,491,088, 4,589,373, and 4,637,345. Each ballast pipe 56 is connected to and supports a corresponding conduit 58 by means of a connector, for example the connector disclosed in copending U.S. patent application Ser. No. 07/747,863 and U.S. Design Patent Application 07/747,599, both entitled "CONNECTOR FOR A WATERING SYSTEM", both filed on Aug. 20, 1991, and assigned to the assignee of the present invention, the disclosures of which are explicitly incorporated by reference. Each row 54 may be suspended within poultry house 48 by means of a hanger, for example the hanger disclosed in U.S. patent application 07/429,226, filed Oct. 31, 1989, now U.S. Pat. No. 5,048,462, entitled "HANGER FOR WATER SUPPLY SYSTEM AND METHOD OF INSTALLATION", assigned to the assignee of the present invention, the disclosure of which is explicitly incorporated by reference.

Figure 12:
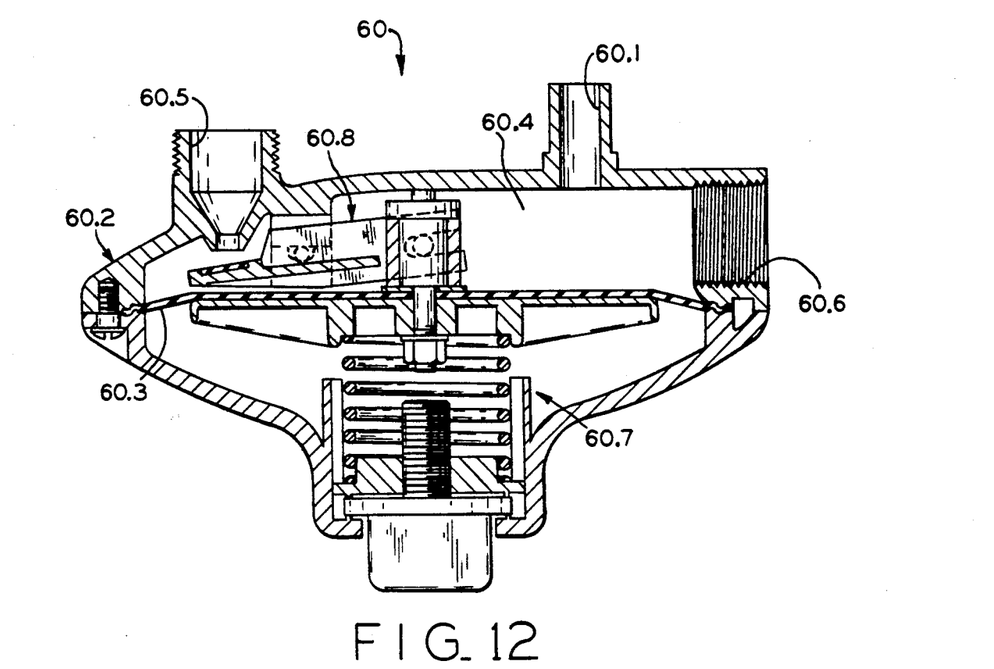
FIG. 12 is a sectional view of a regulator having its interior in a low pressure state.
Figure 13:
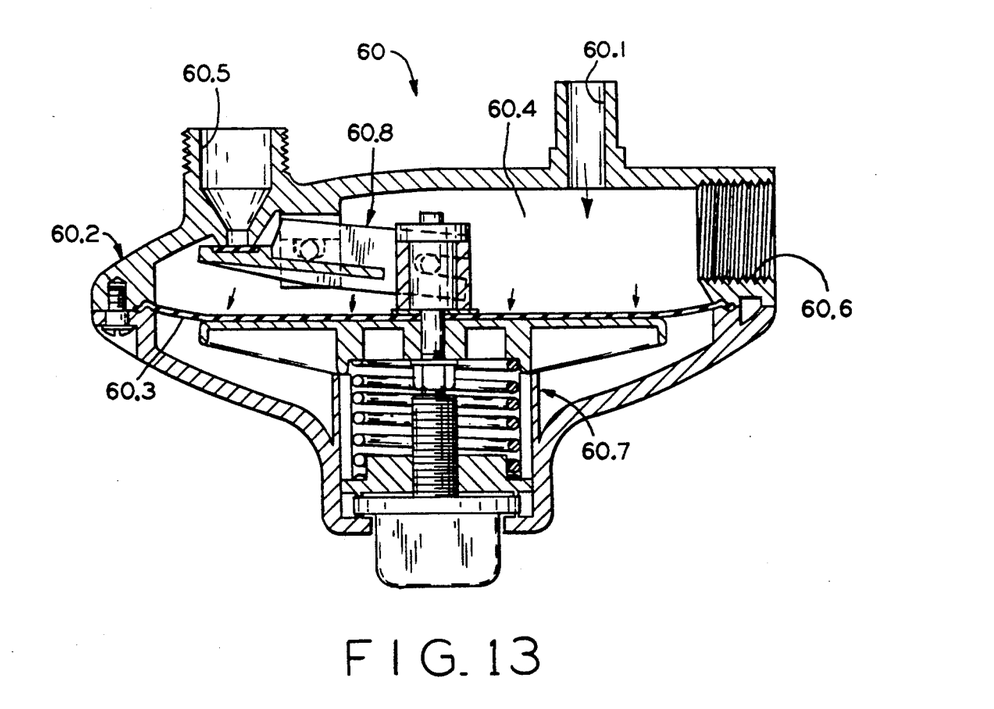
FIG. 13 is a sectional view of a regulator having its interior in a high pressure state.

Regulator 60 is shown in more detail in FIGS. 12 and 13, and is similar to the regulator disclosed in U.S. Pat. No. 4,344,456, entitled "PRESSURE RESPONSIVE LIQUID FLOW REGULATOR", the disclosure of which is explicitly incorporated by reference. Regulator 60 has body 60.2 and diaphragm 60.3 which together define variable volume interior chamber 60.4 which fluidly communicates with riser port 60.1 which is adapted to be connected to a riser tube, inlet or water port 60.5 which is adapted to be connected to a hose, and outlet 60.6 which is adapted to be connected to conduit 58. Diaphragm 60.3 is positioned by spring biasing mechanism 60.7, and varies the volume of interior chamber 60.4 according to its internal fluid pressure. Also, movement of diaphragm 60.3 effects valve mechanism 60.8 which may selectively block inlet 60.5 or allow a limited amount of fluid to pass into interior chamber 60.4. Conventionally, the pressure within interior chamber 60.4 is set to between one third ($\frac{1}{3}$) and one half ($\frac{1}{2}$) pound per square inch for providing water to the drinker v 'ves on conduit 58.

Spring biasing mechanism 60.7 moves diaphragm 60.3 in response to changes of fluid pressure within interior chamber 60.4. FIG. 12 shows regulator 60 wherein the internal fluid pressure within interior chamber 60.4 is relatively low and valve mechanism 60.7 is open, although the open position of valve mechanism 60.7 in FIG. 12 is exaggerated. Under this low pressure condition, spring biasing mechanism 60.7 positions diaphragm 60.3 so that valve mechanism 60.8 allows a limited amount of fluid to be supplied into interior chamber 60.4, but only a sufficient fluid flow to maintain the low pressure condition. FIG. 13 shows regulator 60 wherein the internal fluid pressure within interior chamber 60.4 is relatively high, for example by a source of high pressure fluid entering through riser port 60.1. Under this high pressure condition, spring biasing mechanism 60.7 and diaphragm 60.3 are positioned by the high pressure fluid so that valve mechanism 60.8 blocks fluid communication between inlet 60.5 and interior chamber 60.4.

Figure 8:
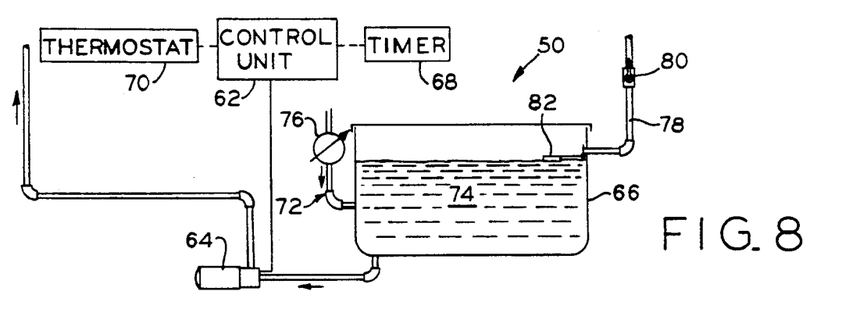
FIG. 8 is a schematic view of the water supply system using a pressure pump.

High pressure fluid supply 50 includes control unit 62, pressure pump 64, and tank 66, see FIG. 8. Control unit 62 is coupled to and controls the activation of pressure pump 64. Optionally, control unit 62 may be coupled to timer 68 and/or thermostat 70 for periodically activating pressure pump 64. Timer 68 is used by control unit 62 to activate pump 64 at specific, predetermined times or according to a periodic frequency, and alternatively control unit 62 may include an integral timing device. Thermostat 70 is coupled to control unit 62 and thermally contacts water within conduits 58 for activating pressure pump 64 in response to temperature conditions in the supplied water.

Tank 6 contains the fluid to be flushed through watering system 46. Pressure pump 64 is fluidly coupled to a relatively lower portion of tank 66 and to rows 54 of watering system 46. Fluid return line 72 is also fluidly coupled to rows 54 of watering system 46 and to tank 66. Optionally, valve 76 may be provided on fluid return 72 so that tank 66 may be isolated from conduits 58 when pump 64 is inoperative.

Flushing fluid 74 is supplied to tank 66 by water main 78, which may be manually closed by valve 80 or opened and closed by float valve 82 according to the level of flushing fluid 74. Flushing fluid 74 may simply comprise water from water main 78, or alternatively may include cleaning additives, and/or may be maintained at a specified temperature. For cleaning fluid, the water may include a weak acid or other disinfecting agent. For heated or cooled fluid, tank 66 may further include heaters or coolers (not shown) which may be activated by control unit 62 to maintain the specified temperature.

Figure 9:
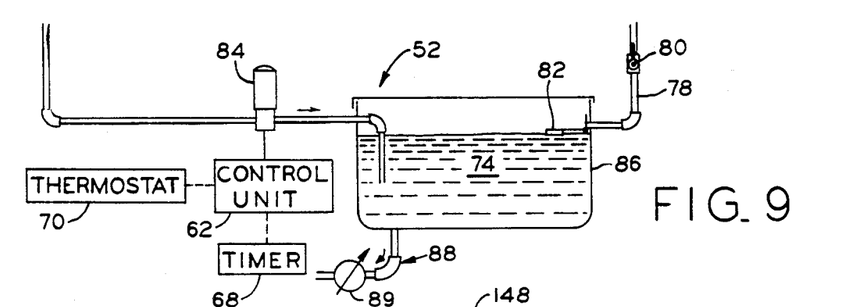
FIG. 9 is a schematic view of the water supply system using a suction pump.

Alternatively, high pressure fluid supply 52 may include control unit 62, suction pump 84, and tank 86, see FIG. 9. Fluid supply 52 differs from fluid supply 50 in that suction pump 84 is fluidly coupled to tank 86 in a return line from rows 54 of watering system 46, whereas fluid supply line 88 is fluidly coupled to a bottom portion of tank 86 and to rows 54 of watering system 46. Optionally, valve 89 may be provided on fluid supply line 88 so that tank 86 may be isolated from conduits 58 when pump 84 is inoperative.

Figure 3:
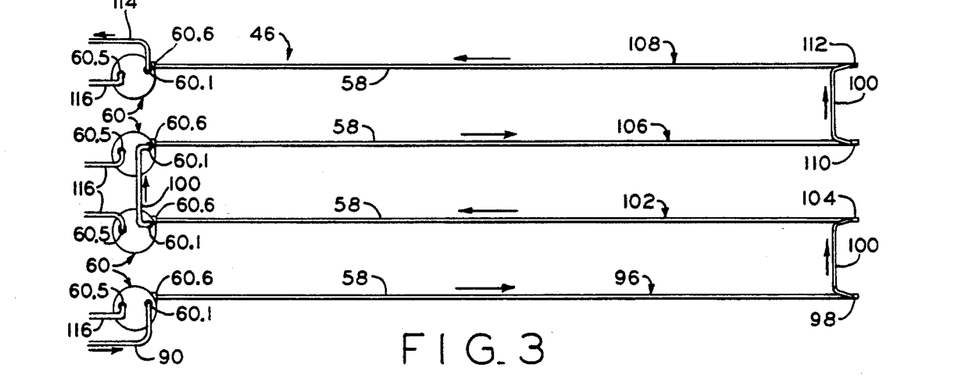
FIG. 3 is top schematic view of the conduits of the watering system.

In accordance with the present invention, a high pressure fluid path is created through watering system 46 by application of a pressurized flushing fluid, the flow of which is shown in FIG. 3 by arrows indicating the direction of the high pressure fluid flow. The high pressure fluid path begins at high pressure inlet line 90 which is coupled to a fluid source such as high pressure fluid supply 50 and/or 52. Inlet line 90 is also fluidly coupled to riser port 60.1 of the regulator 60 which has its outlet 60.6 coupled to conduit 58 of first row 96. Inlet line 90 may include a riser tube connected to riser port 60.1 and contain a ball wherein the height of the ball indicates the pressure level at riser port 60.1. At end 98 of first row 96, riser connector 100 fluidly couples row 96 with second row 102 at end 104. Second row 102 and third row 106 are fluidly coupled by riser connector 100 which connects respective riser ports 60.1 of regulators 60 of rows 102 and 106. The high pressure fluid circuit continues through third row 106 to fourth row 108 via riser connector 100 which fluidly couples end 110 of third row 106 to end 112 of fourth row 108. The high pressure fluid circuit extends through conduit 58 of fourth row 108 to riser port 60.1 of regulator 60 of fourth and last row 108. Discharge line 114 provides an exit for the flushing fluid, which may be fluidly coupled with a disposal tank.

Watering system 46 is conventionally operated by supplying pressurized fluid through water supply lines 116 which are connected to water ports 60.5 of regulators 60. Water supply lines 116 may be connected to a tank (not shown) holding a supply of drinking water, or alternatively may be connected to the water main (not shown). Regulators 60 then provide a low pressure water supply to conduits 58 by restricting entry of water from the water ports 60.5 into internal chamber 60.4 of regulator 60. The fluid pressure within internal chamber 60.4 determines the extent of the restriction of entering water, and determines the height of riser balls (not shown in FIG. 3) within the riser tubes (of inlet 90, riser connector 100, or discharge line 114) attached to riser ports 60.1.

In the operation of the cleaning system of watering system 46, high pressure fluid is supplied to riser port 60.1 of first row 96. The high pressure fluid supply builds the internal pressure in internal chamber 60.4 and prevents any fluid entry from water ports 60.5. Thus, fluid being supplied through water supply lines 116 is substantially uncontaminated by the cleaning fluid being circulated by high pressure supply 50 or 52. The high pressure cleaning fluid serially flows through rows 96, 102, 106, and 108 before exiting via discharge line 114. This high pressure fluid circuit includes the entire lengths of every conduit 58 of watering system 46, thus scraping all the interior surfaces. Additionally, a mouse (not shown) may be used to scrape biofilm from the conduit interior. The system shown in FIG. 2 is well adapted for the use of a mouse because of the softly curving conduits of the high pressure flow path.

Figure 11:
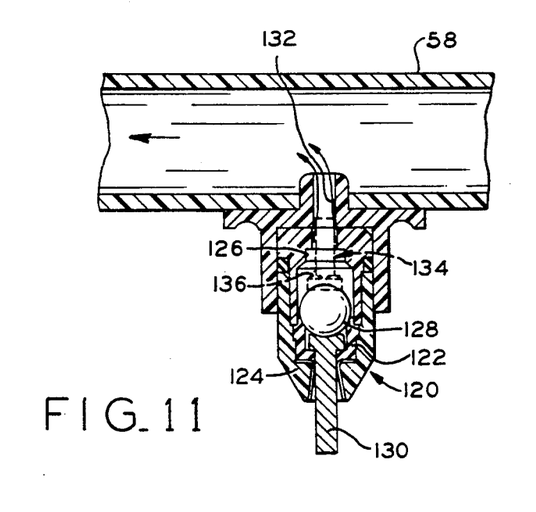
FIG. 11 is a sectional view of the conduit and drinker valve.
Figure 14:
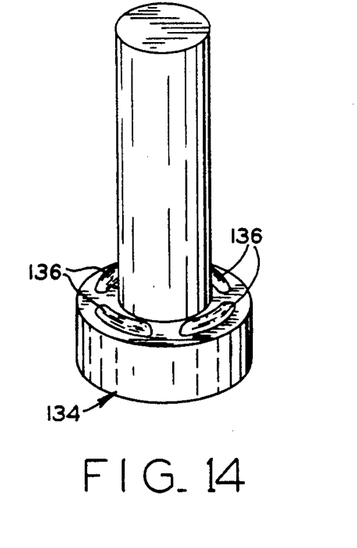
FIG. 14 is a perspective view of the portion of the two stage watering pin with nubs of FIG. 11.

In accordance with another aspect of the present invention, dirt and other contaminants in the valve body of drinkers 120 may be removed by the pulsation of the high pressure fluid in conduit 58, see FIG. 11. Drinker 120 includes valve seat 122 and valve body 124 which define drinker cavity 126. Cavity 126 houses valve ball 128 which rests on valve pin 130, similar to the drinker valves disclosed in U.S. Pat. Nos. 4,284,036, 4,491,088, 4,589,373 and 4,637,345. When high pressure pump 50 pulsates, a pressure differential develops between the fluid pressure in cavity 126 and the fluid pressure within conduit 58. This pressure differential creates a vacuum effect which draws the fluid, and any suspended particles, out of cavity 126 through opening 132 and into conduit 58 in the direction of the high pressure flow (see the arrows in FIG. 11). The vacuum effect may be accentuated by pulsating pump 50 at a predetermined frequency, for example, alternately operating pump 50 for five (5) seconds and deactivating it one (1) second. The optimal frequency for such pulsations is determined by such considerations as the size of the poultry house and the size of the pump. This vacuum effect draws out the fluid from within cavity 12 previous to the renewed low pressure water supply from regulators 60. If metering pin 134 is provided with drinkers 120, then pin 134 preferably includes nubs 136 so that pin 134 does not block fluid passage through opening 132 and fluid may escape when the vacuum effect draws fluid out of cavity 126. FIG. 14 shows a more detailed view of pin 134 with nubs 136.

Figure 10:
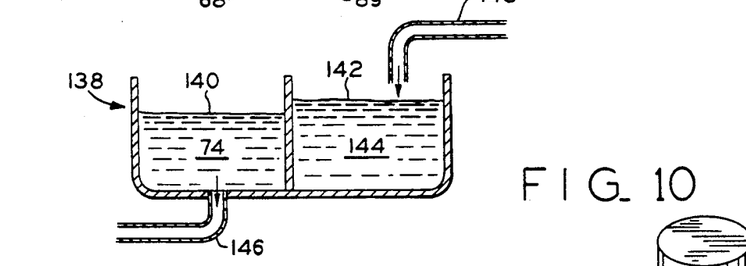
FIG. 10 is a schematic view of a water tank having supply and return sections.

The waste water created by the flushing and vacuum effect of the high pressure water flow may be disposed of in a separate tank as shown in the alternative arrangement of FIG. 10. Tank 138 is shown as having supply portion 140 for holding flushing fluid 74 and return portion 142 for holding waste water 144. Supply portion 140 includes supply line 146 fluidly connected at the bottom for supplying flushing fluid 74 to high pressure inlet line 90 of FIG. 3, and return portion 142 includes return line 148 which is fluidly coupled to discharge line 114 of FIG. 3.

Figure 4:
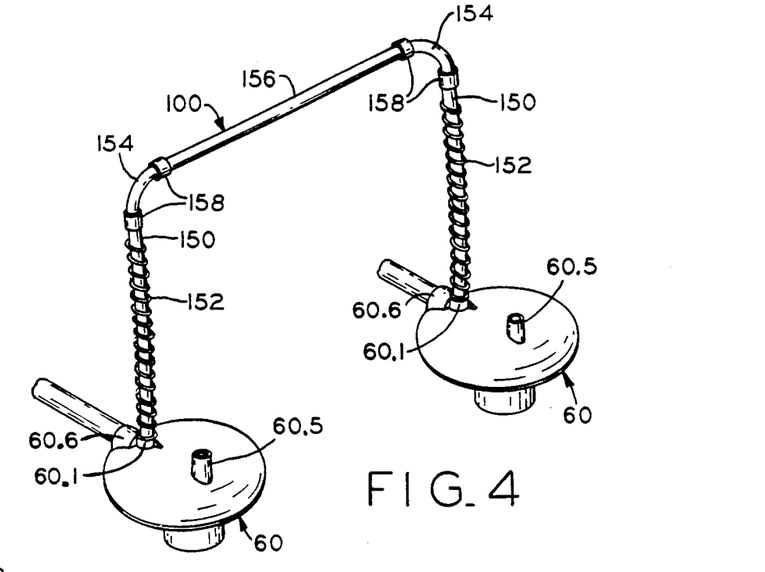
FIG. 4 is a perspective view of the connection of two regulators.

In order to provide the high pressure fluid circuit of the present invention, some means of serially connecting conduits 58 of watering system 46 is required. Riser connectors 100 may fluidly couple adjacent rows 54 at regulators 60 or at opposite ends 98, 104, 110, and 112 to form the high pressure fluid circuit. In FIG. 4, riser connector 100 fluidly couples two regulators 60 between respective riser ports 60.1.

Riser connector 100 includes riser tubes 150, helical support spring 152, elbow joints 154, elongate tube 156, and fluid couplings 158. Riser tubes 150 are connected at their lower end to riser ports 60.1, and fluidly communicate through the connection at their upper ends by elbow joints 154 which are fluidly coupled by elongate tube 156. Fluid couplings 158 join together the upper ends of riser tubes 150 and joints 154, and also join together joints 154 and tube 156. Riser connectors 100 may be used as shown between two regulators 60, or alternatively to fluidly couple one regulator 60 with an end of conduit 58, or alternatively to fluidly couple two conduits 58 at their ends which are not connected to regulators 60. To locate elongate tube 156 out of the path of persons walking through poultry house 48, riser tubes 150 may extend up to the ceiling (see riser connector 100.1 of FIG. 2). Alternatively, additional tubing may be added between riser tube 150 and elbow joints 154 to have tube 156 extend up to the ceiling. As a further alternative, U-joints may be used in place of elbow joints 154 so that tubing may extend from the U-joint to the floor (not shown) of poultry house 48 so that the remainder of the fluid coupling may extend down to or below the floor (see riser connector 100.2 of FIG. 2).

Figures 5, 6, 7:
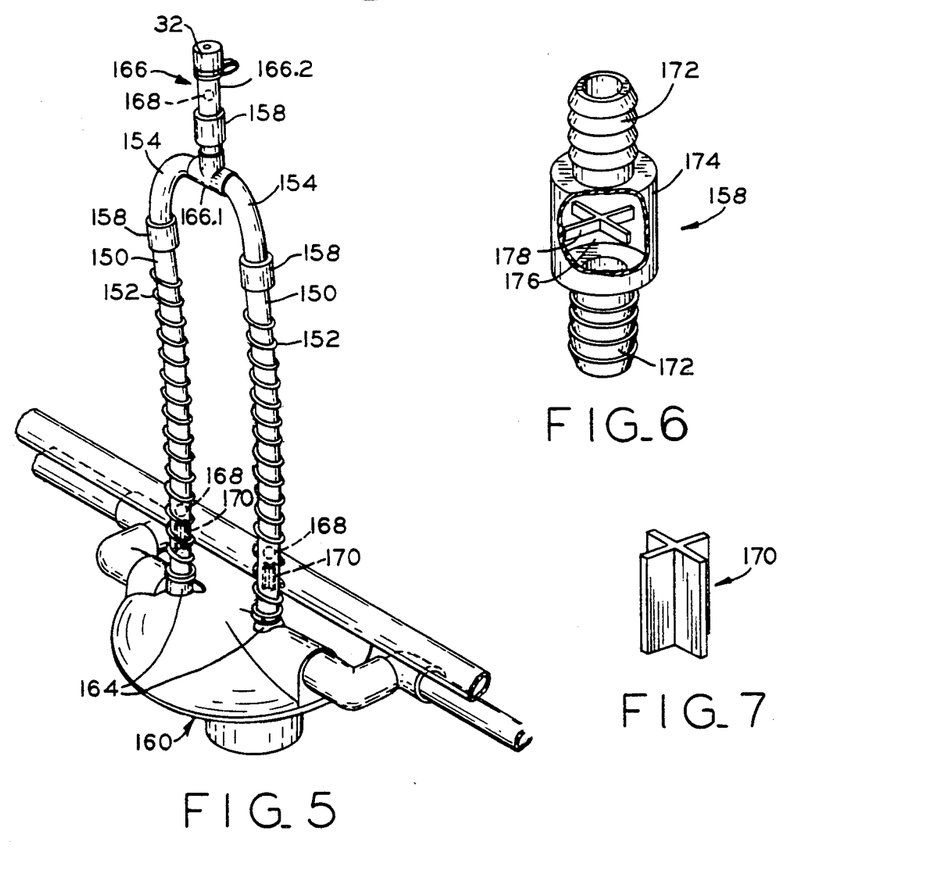
FIG. 5 is a perspective view of a slope regulator appropriately coupled in accordance with the present invention.
FIG. 6 is a perspective view, in partial cut-away, of a fluid coupling.
FIG. 7 is a perspective view of a anti-seating device.

A coupling similar to riser connector 100 is used with slope regulator 160 as shown in FIG. 5. Slope connector 162 includes riser tubes 150 coupled to riser ports 164 of slope regulator 160, elbow joints 154 coupled to riser tubes 150 by fluid couplings 158, and check valve 166 which couples joints 154. In prior art systems, during flushing of the watering system the slope regulators would have to be by-passed so that the slope regulators would not block the high pressure fluid flow. When flushing fluid enters slope regulator 160 connected with slope connector 162, instead of traversing through regulator 160 the flushing fluid follows the path of least resistance which is through slope connector 162. The high pressure fluid circuit includes slope connector 162 and avoids its flow restricting mechanisms. Any air trapped within slope connector 162 may exit via check valve assembly 166, which includes a T-joint 166.1 connecting elbow joints 154 with coupling 158 which further connects with riser tube 166.2 so that air may escape out tube 166.2 through riser cap 32.

Although riser tubes 150 are used in fluid connector 100 and slope connector 160 as tubular fluid conduits, they may include riser balls 168 which may indicate the pressure at points within Watering system 46. To prevent balls 168 from blocking riser tubes 150 during watering or flushing operation, ball blocks 170 (FIG. 7) allow riser tubes to function as pressure indicators. Referring to FIG. 5, ball block 170 is positioned adjacent to riser port 164 to prevent ball 168 from blocking port 164 while still allowing substantial fluid flow around block 170 and through riser tube 150. Ball block 170 has an elongated body in the form of an "x" which extends across port 164 and allows fluid passage through most of port 164.

Balls 168 are also prevented from escaping from the upper end of riser tubes 150 by fluid couplings 158, which are depicted in FIG. 6. Fluid couplings 158 include fittings 172 extending from both sides of central portion 174. Fittings 172 are adapted to be received by a tubular component, such as riser tubes 150, elbow joints 154, and tube 156. Chamber 176 is defined by central portion 174 and provides a fluid communication path between fittings 172, with separator 178 disposed within the fluid communication path of chamber 176. Separator 178 is cross-shaped like ball block 170, although not as long, and is structured and arranged to prevent ball 168 from passing through coupling 158. Fluid couplings 158 thus fluidly connect components of riser connector 100 or slope connector 150 while preventing blockage of the fluid path.

In the preferred embodiment, pressure pump 64 produces a fluid pressure of in the range of 10 pounds per square inch (psi) to 190 psi, more particularly in the range of 40 psi to 150 psi, and preferably of 125 psi. These pressures substantially exceed the low pressure provided by the regulator, which is usually in the range of $\frac{1}{3}$ psi to $\frac{1}{2}$ psi.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A watering system for fowl and small animals, said watering system adapted to be connected to a source of a first fluid and a source of a second fluid, said watering system comprising:

a conduit for fluid transmission, said conduit including an inlet, an outlet, and a plurality of drinker valves;

means for supplying the first fluid to said conduit;

means for supplying the second fluid to said conduit; and control means for fluidly coupling said conduit inlet alternatively to said first fluid supplying means and to said second fluid supplying means, said control means including regulator means for providing the first fluid from said first fluid supplying means to said conduit at a predetermined, relatively low pressure, said control means also including activating means for automatically activating said second fluid supplying means, whereby when said second fluid supplying means is not activated said regulator means provides the first fluid to said conduit at said low pressure, and upon activation of said second fluid supplying means by said activating means, said second fluid supplying means provides the second fluid to said conduit at a relatively high pressure for flushing said conduit.

2. The watering system of claim 1 wherein said control means includes a timer, said activating means periodically activating said second fluid supplying means at predetermined times according to said timer.

3. The watering system of claim 1 further comprising a separate disposal tank, wherein said conduit outlet is fluidly coupled to said disposal tank.

4. The watering system of claim 1 wherein said first fluid supplying means supplies animal drinking water and said second fluid supplying means supplies a cleaning solution.

5. The watering system of claim 1 wherein said control means includes a temperature sensor thermally contacting said conduit, said activating means selectively activating said second fluid supplying means according to the temperature sensed by said temperature sensor.

6. The watering system of claim 1 wherein said first fluid supplying means supplies the first fluid at a first predetermined temperature, and said second fluid supplying means supplies the second fluid at a second, different predetermined temperature.

7. The watering system of claim 1 wherein said regulator means also includes an outlet coupled to said conduit inlet, an internal fluid chamber, and first and second regulator inlets coupled to said first and second fluid supplying means, respectively, said regulator means providing fluid communication between said conduit and said first fluid supplying means when the pressure in said internal fluid chamber drops below said low pressure, said regulator means ceasing to provide fluid communication between said conduit and said first fluid supplying means when the pressure in said internal fluid chamber rises above said low pressure, whereby said second fluid supplying means raises the pressure within said internal fluid chamber thereby disabling said first fluid supplying means when said activating means activates said second fluid supplying means.

8. The watering system of claim 1 wherein said second fluid supplying means includes a pressure pump.

9. The watering system of claim 1 wherein said second fluid supplying means includes a suction pump.

10. A watering system for fowl and small animals, said watering system comprising:
a conduit for fluid transmission, said conduit including an inlet, an outlet, and a plurality of drinker valves;
means for supplying fluid to said conduit at a relatively low predetermined pressure;
means for supplying fluid to said conduit at a relatively high predetermined pressure;
high pressure fluid circuit means for providing a high pressure fluid flow path through said conduit; and
means for automatically activating said high pressure fluid supplying means whereby activation of said high pressure fluid supplying means causes high pressure fluid flow through said high pressure fluid flow path and disables said low pressure fluid supplying means during activation of said high pressure fluid supplying means.

11. The watering system of claim 10 wherein said selectively activating means includes a timer, said selectively activating means periodically activating said high pressure fluid supplying means at predetermined times according to said timer.

12. The watering system of claim 10 further comprising a separate disposal tank, wherein said conduit outlet is fluidly coupled to said disposal tank.

13. The watering system of claim 10 wherein said low pressure fluid comprises animal drinking water and said high pressure fluid comprises a cleaning solution.

14. The watering system of claim 10 wherein said selectively activating means includes a temperature sensor thermally contacting said conduit, with said selectively activating means activating said high pressure fluid supplying means according to the sensed temperature of said temperature sensor.

15. The watering system of claim 10 wherein said low pressure fluid is at a first predetermined temperature, and said high pressure fluid is at a second, different predetermined temperature.

16. The watering system of claim 10 wherein said low pressure fluid supplying means includes a regulator in fluid communication with said conduit inlet and said high pressure fluid supplying means, said regulator also including an outlet coupled to said conduit inlet, an internal fluid chamber, and a high pressure regulator inlet coupled to said high pressure fluid supplying means, respectively, said regulator providing fluid communication between said conduit and a source of drinking water when the pressure in said internal fluid chamber falls below said low pressure, said regulator ceasing to provide fluid communication between said conduit and the drinking water source when the pressure in said internal fluid chamber exceeds said low pressure, whereby activation of said high pressure fluid supplying means raises the pressure within said internal fluid chamber thereby isolating the drinking water source from said conduit when said selectively activating means activates said high pressure fluid supplying means.

17. The watering system of claim 10 wherein said high pressure fluid supplying means includes a pressure pump.

18. The watering system of claim 10 wherein said high pressure fluid supplying means includes a suction pump.

19. A watering system for fowl and small animals, said watering system adapted to be coupled to a water supply, said watering system comprising:
a plurality of conduits for fluid transmission including a first conduit, each said conduit including an inlet, an outlet, and a plurality of drinker valves;
a plurality of low pressure regulators, each said regulator coupled to a respective conduit inlet and having an input port and a riser port, each said input port adapted to be coupled to the water supply;
means for supplying high pressure fluid including pump means for pressurizing and propelling said high pressure fluid through said conduits;

high pressure circuit means coupled to said high pressure fluid supplying means for providing a high pressure fluid flow path through a series arrangement of said conduits; and activating means for selectively activating said high pressure fluid supplying means whereby said high pressure fluid is flushed through said conduits via said high pressure circuit means.

20. The watering system of claim 19 wherein said activating means includes a timer, said activating means periodically activating said high pressure fluid supplying means at predetermined times according to said timer.

21. The watering system of claim 19 further comprising a separate disposal tank, wherein said series arrangement of said conduits is fluidly coupled to said disposal tank.

22. The watering system of claim 19 wherein said high pressure fluid comprises a cleaning solution.

23. The watering system of claim 19 wherein said control means includes a temperature sensor thermally contacting one of said conduits, with said activating means activating said high pressure fluid supplying means according to the temperature sensed by said temperature sensor.

24. The water system of claim 19 wherein said high pressure fluid is at a predetermined temperature which is different from the temperature of the water supply.

25. The watering system of claim 19 wherein each said low pressure regulator provides water to said conduits at a low pressure relative to said high pressure fluid, with each said low pressure regulator being in fluid communication with said respective conduit inlet, the water supply, and said high pressure circuit means, said regulator also including an outlet coupled to said conduit inlet, an internal fluid chamber, and having said riser port coupled to said high pressure circuit means, each said regulator providing fluid communication between said conduit and the water supply when the pressure in said internal fluid chamber drops below said low pressure, each said regulator ceasing to provide fluid communication between said conduit and the water supply when the pressure in said internal fluid exceeds said low pressure, whereby said high pressure fluid supplying means raises the pressure within said internal fluid chamber thereby isolating the water supply from said conduit when said activating means activates said high pressure fluid supplying means.

26. The watering system of claim 19 wherein said high pressure fluid supplying means includes a pressure pump.

27. The watering system of claim 19 wherein said high pressure fluid supplying means includes a suction pump.

28. A watering system for fowl and small animals, said watering system adapted to be coupled to a water supply, said watering system comprising:

a plurality of conduits for fluid transmission including a first conduit, each said conduit including an inlet, an outlet, and a plurality of drinker valves;

a plurality of low pressure regulators associated with respective ones of said conduits, said respective conduits and low pressure regulators forming a plurality of rows, each said regulator having an outlet coupled to a respective conduit inlet and having an input port and a riser port, each said input port adapted to be coupled to the water supply;

means for supplying high pressure fluid to said plurality of conduits;

high pressure circuit means for providing a high pressure fluid flow path including a fluid coupling between said high pressure fluid supplying means and said first conduit riser port associated with said first conduit, a second fluid coupling between said first conduit outlet and another one of said rows, and a series arrangement of said rows having adjacent rows fluidly coupled at said conduit outlets and said riser ports; and activating means for selectively activating said high pressure fluid supplying means and said high pressure circuit means thereby causing fluid communication between said plurality of conduits and said high pressure fluid supplying means.

29. The watering system of claim 28 wherein said activating means includes a timer, said activating means periodically activating said high pressure fluid supplying means at predetermined times according to said timer.

30. The watering system of claim 28 further comprising a separate disposal tank, wherein said series arrangement of said rows is fluidly coupled to said disposal tank.

31. The watering system of claim 28 wherein said high pressure fluid comprises a cleaning solution.

32. The watering system of claim 28 wherein said activating means includes a temperature sensor thermally contacting one of said conduits, with said activating means activating said high pressure fluid supplying means according to the temperature sensed by said temperature sensor.

33. The watering system of claim 28 wherein said high pressure fluid is at a different predetermined temperature than the temperature of the water supply.

34. The watering system of claim 28 wherein said high pressure fluid supplying means includes a pressure pump.

35. The watering system of claim 28 wherein said high pressure fluid supplying means includes a suction pump.

36. A watering system for fowl and small animals, said watering system adapted to be connected to a source of a first fluid and a source of a second fluid, said watering system comprising:

a conduit for fluid transmission through an internal passageway defined by internal conduit surfaces, said conduit including an inlet, an outlet, and a plurality of drinker valves;

means for supplying the first fluid to said conduit;

means for supplying the second fluid to said conduit, said second fluid supplying means including pump means for pressurizing and propelling said second fluid through said conduit; and means for selectively flushing said conduit with the second fluid from said second fluid supplying means whereby said second fluid flushes through said internal passageway and scrapes biofilm and other particulate from said internal conduit surfaces.

37. The watering system of claim 36 wherein said flushing means includes a timer, said flushing means periodically flushing said high pressure fluid through said conduit at predetermined times according to said timer.

38. The watering system of claim 36 further comprising a separate disposal tank, wherein said conduit outlet is fluidly coupled to said disposal tank.

39. The watering system of claim 36 wherein said first fluid supplying means supplies animal drinking water and said second fluid supplying means supplies a cleaning solution.

40. The water system of claim 36 wherein said flushing means includes means for pulsating said second fluid supplying means.

41. The watering system of claim 36 wherein said flushing means includes a temperature sensor thermally contacting said conduit, with said flushing means flushing said second fluid through said conduit according to the temperature sensed by said temperature sensor.

42. The watering system of claim 36 wherein said first fluid supplying means supplies the first fluid at a first predetermined temperature, and said second fluid supplying means supplies the second fluid at a second, different predetermined temperature.

43. The watering system of claim 36 wherein said flushing means includes a regulator in fluid communication with said conduit inlet and said first and second fluid supplying means, said flushing means also including means for activating and deactivating said second fluid supplying means, said regulator also including an outlet coupled to said conduit inlet, an internal fluid chamber, and first and second inlets coupled to said first and second fluid supplying means, respectively, said regulator providing fluid communication between said conduit and said first fluid supplying means when the pressure in said internal fluid chamber drops below a first pressure, said regulator ceasing to provide fluid communication between said conduit and said first fluid supplying means when the pressure in said internal fluid chamber exceeds said first pressure, whereby said second fluid supplying means raises the pressure within said internal fluid chamber thereby disabling said first fluid supplying means when said flushing means activates said second fluid supplying means.

44. The watering system of claim 36 wherein said second fluid supplying means includes a pressure pump.

45. The watering system of claim 36 wherein said second fluid supplying means includes a suction pump.

46. The watering system of claim 36 further comprising a slope regulator fluidly connected with said conduit at a location intermediate said inlet and said outlet of said conduit, said slope regulator including means for providing a high pressure fluid flow path through said regulator when said flushing means flushes said second fluid through said internal passageway.

* * * * *

UNITED STATES PATENT AND TRADEMARK OFFICE
CERTIFICATE OF CORRECTION

PATENT NO. : 5,184,571
DATED : February 9, 1993
INVENTOR(S) : Robert D. Hostetler, et al It is certified that error appears in the above-identified patent and that said Letters Patent is hereby corrected as shown below:

In the Abstract line 8, delete "nitrients" and insert therefor --nutrients--.

Claim 28, column 14, line 6, after "said" first occurrence, delete "first conduit".

Signed and Sealed this

Sixteenth Day of November, 1993

Attest:

BRUCE LEHMAN

Attesting Officer

Commissioner of Patents and Trademarks